R. C. WALL.
TOP HOLDER FOR VEHICLES.
APPLICATION FILED MAY 19, 1914.
1,139,742.
Patented May 18, 1915.
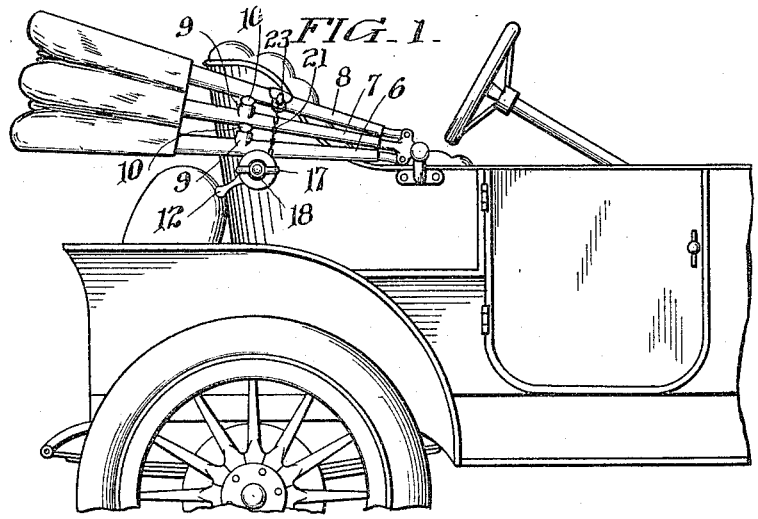
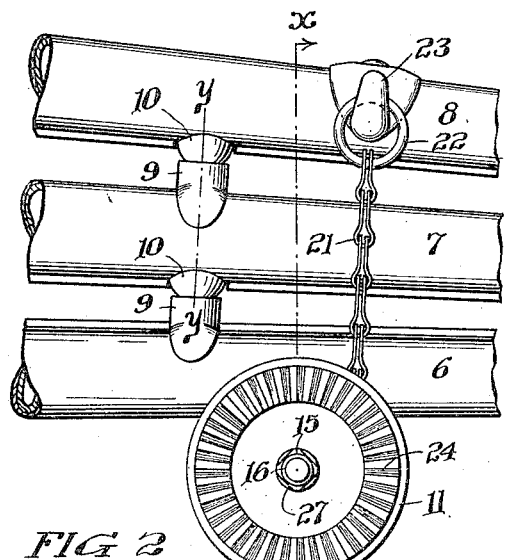
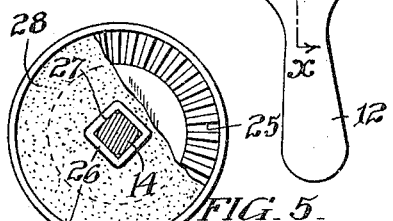
WITNESSES
Daniel Webster, Jr.
E. W. Smith
INVENTOR
Robert C. Wall
BY
ATTORNEY

UNITED STATES PATENT OFFICE.

ROBERT C. WALL, OF PHILADELPHIA, PENNSYLVANIA.

TOP-HOLDER FOR VEHICLES.

1,139,742.   Specification of Letters Patent.   Patented May 18, 1915.

Application filed May 19, 1914. Serial No. 839,486.

*To all whom it may concern:*

Be it known that I, ROBERT C. WALL, a citizen of the United States, and resident of Philadelphia, county of Philadelphia, and State of Pennsylvania, have invented an Improvement in Top-Holders for Vehicles, of which the following is a specification.

My invention has reference to top-holders for vehicles, and consists of certain improvements which are fully set forth in the following specification and shown in the accompanying drawings which form a part thereof.

My invention has for an object to provide a holder mechanism, for tops of the folding or collapsible type, whereby the top bows may be quickly and easily engaged drawn together and positively locked in the folded condition of the top.

It has for a further object to provide a holder the parts of which are so constructed and arranged as not only to operate in an effective manner but to eliminate rattling of the top or the parts of the holder under ordinary conditions of use.

My invention also comprehends details of construction which, together with the features above specified, will be better understood by reference to the drawings, in which:

Figure 1 represents a side elevation of a portion of an automobile showing a top equipped with the holder embodying my invention; Fig. 2 represents a side elevation of the holder device in operative relation to the bows of the top, a portion of the holder being removed to more clearly show the interior construction; Fig. 3 represents a section on line *x—x* of Fig. 2; Fig. 4 represents one of the spring locking members; and Fig. 5 represents a section on line *y—y* of Fig. 2.

1 designates a post or support adapted to be secured in position upon the body of an automobile or like vehicle adjacent to the location of the top in folded condition. The body 2 of the holder is provided with a socket 3 to receive the post 1 and whereby the body may be properly secured by the set screw 4 or like fastening device. The body 2 is also, preferably, provided with a concave seat 5 for the purpose of receiving and supporting the lowermost bow 6 of the top frame, it being understood that the remaining top bows 7 and 8 seat one upon the other by use of the usual bow rests 9 and bow separators 10. The bows may be of any number and of any usual construction.

11 designates a disk having a handle 12 formed, in the present instance, integral therewith and also provided with a hub 13 adapted to fit over the spindle 14 of the body 2, this stem extending outwardly from the body and terminating in a threaded portion 15 and a threaded end 16 of reduced diameter. The threads of the portions 15 and 16 are preferably oppositely cut, that is to say, one is a right hand thread, while the other is a left, so that while the wing nut 17 may have adjustment upon the threaded portion 15, it is prevented from becoming unscrewed and detached from the stem by the nut or head 18 upon the end 16, the left hand thread of the latter preventing its becoming accidentally unscrewed by the action of the wing nut. The disk 11 at its outer edges abuts a circumferential flange 19 of the body and forms therewith a compartment or chamber 20 which serves as a receptacle for the winding chain 21, the inner end of which is fixed to the hub 13 in any suitable manner. The outer end of this chain carries a ring 22 or like device adapted to engage or receive the hook 23 which is made fast to the upper bow 8 as will be readily apparent. 24 designates a series of teeth radially arranged about the outer face of the disk 11 and in opposed relation to a similar set of teeth 25 formed upon the cap 26. The cap, in the present instance, is centrally apertured to conform to the square or polygonal portion 27 of the spindle 14, this arrangement affording a means to lock the disk 11 against rotation when the parts are once in adjusted position.

28 designates a disk of fiber or like material interposed between the teeth 25 of the cap 26, and the teeth 24 of the disk 11 in order to provide a suitable surface into which the teeth may bite, and this positively holds the parts in fixed relation. This disk 28 is fixed to the cap 26 in such a manner as to prevent its rotation.

It will be understood that the teeth 25 of the cap 26 are formed in substantially the same arrangement as the teeth 24, and therefore the illustration of one set of teeth as shown in Fig. 2 as being sufficient for both purposes.

A spring 29, here shown as a split ring construction, is preferably placed between the wing nut 17 and the cap 26 for the purpose of properly tensioning the locking pressure.

In the operation of the device it will be assumed that the top has been lowered to its folded position ready for fastening. The lock nut 18 is first slightly loosened so that the wing nut 17 may be turned sufficiently to relieve the binding action between the cap 26 and the disk 24, thereby releasing the disk 11 so that the chain 21 may be drawn out to a position where the ring 22 may be placed upon the hook 23. The handle 12 is then swung in the proper direction to wind the chain upon the hub 13, thus drawing the several bows of the top firmly together, and when the proper degree of tension has been secured, the thumb nut 17 is tightened, causing the two sets of teeth to bite the fiber disk 28 to lock the rotatable parts, as will be understood. In the act of releasing the bows, the wing or thumb nut is unscrewed until the bite upon the fiber disk 28 is released to permit the disk 11 to be turned to release the tension on the chain. It will further be understood that each side of the vehicle carries one of the holders so that both sides of the top are fastened in like manner and held securely.

It will be noted that the device consists of few parts, all of which may be quickly assembled or taken apart, and when locked together in operative condition are firmly held one part to another, whereby rattling or jarring loose of the parts is eliminated. While I have, in illustrating the invention, shown a chain as the preferred means for drawing the bows together through the medium of the winding device, it will be understood that this is shown only by way of example as various equivalent devices may be substituted within the scope of my invention to carry out the same function.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having thus described my invention, what I claim and desire to protect by Letters Patent is:—

1. In a device of the character stated, a body part provided with a seat to receive a bow of a top, a spindle carried by said body part, a winding device rotatably mounted on said spindle and having a disk forming a part of said winding device said disk provided with a friction surface, a flexible member secured at one end to said winding device and having its opposite end arranged for connection with another bow of said top, a second disk non-rotatably mounted on said spindle and also provided with a friction surface juxtaposed with respect to said winding disk friction surface, a disk of relatively yielding material interposed between said friction surfaces, and means to clamp the friction surface of the non-rotatable disk upon said soft disk and force it into friction engagement with the friction surface of the winding disk to lock said winding device, and means to support said body part on a vehicle.

2. In a device of the character stated, a body part, a spindle carried thereby, a winding device rotatably mounted on said spindle, a disk forming a part of said winding device and provided with a set of teeth, a flexible member secured at one end to said winding device and having its opposite end arranged for connection with a bow of a top, a second disk mounted on said spindle provided with a set of teeth juxtaposed with respect to said winding disk teeth, means intermediate of said sets of teeth to transmit a clamping action from one set of teeth to the other, means to clamp said sets of teeth to lock said winding device, and means to support said body part.

3. In a device of the character stated, a body part, a spindle carried thereby, a winding device rotatably mounted on said spindle, a disk forming a part of said winding device and provided with a set of teeth, a flexible member secured at one end to said winding device and having its opposite end arranged for connection with a bow of a top, a second disk mounted on said spindle provided with teeth juxtaposed with respect to said winding disk teeth, a disk of relatively soft material interposed between said sets of teeth, means to clamp said teeth upon said soft disk to lock said winding device, and means to support said body part on a vehicle.

4. In a device of the character stated, a body part provided with a seat to receive a bow of a top, a spindle carried by said body part, a winding device rotatably mounted on said spindle, a disk forming a part of said winding device and provided with a set of teeth, a flexible member secured at one end to said winding device, and having its opposite end arranged for connection with another bow of said top, a second disk mounted on said spindle with provision against rotation, and provided with a set of teeth juxtaposed with respect to said winding disk teeth, a disk of relatively soft material interposed between said sets of teeth, a clamping nut threaded on said spindle, a yielding member between said nut and the second disk to exert a clamping pressure upon the disks to lock the winding device, a nut oppositely threaded on the end of said spindle for limiting the unscrewing adjustment of said clamping nut, and means to support said body part on a vehicle.

5. In a device of the character stated, a body part having a chambered portion, and provided with a stud, a winding disk having a handle rotatably mounted on said stud and provided with a hub within the chambered portion of the body part, said winding disk also provided with teeth, a flexible mechanism secured at one end to the hub of said winding device and having its free end arranged for connection with a bow of a vehicle top, a second disk mounted on said stud and held against rotation and provided with teeth juxtaposed with respect to said winding disk teeth, a disk of relatively soft material interposed between said sets of teeth, means to adjust the second disk to cause the teeth to bite upon said soft disk to lock said winding device, and means to attach said body part on a vehicle.

In testimony of which invention, I hereunto set my hand.

R. C. WALL.

Witnesses:
R. M. HUNTER,
FLORENCE DEACON.

Copies of this patent may be obtained for five cents each, by addressing the "Commissioner of Patents, Washington, D. C."